US008936718B2

(12) United States Patent
MacDonald

(10) Patent No.: US 8,936,718 B2
(45) Date of Patent: *Jan. 20, 2015

(54) METHOD FOR PRODUCING BASE LUBRICATING OIL FROM WASTE OIL

(75) Inventor: Martin R. MacDonald, Plano, TX (US)

(73) Assignee: Verolube, Inc., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/108,979

(22) Filed: May 16, 2011

(65) Prior Publication Data

US 2011/0278151 A1 Nov. 17, 2011

Related U.S. Application Data

(60) Continuation of application No. 12/421,002, filed on Apr. 9, 2009, now abandoned, which is a division of application No. 11/076,436, filed on Mar. 8, 2005.

(51) Int. Cl.
| | |
|---|---|
| C10M 175/02 | (2006.01) |
| C10G 7/00 | (2006.01) |
| C10G 7/12 | (2006.01) |
| C10G 71/00 | (2006.01) |

(52) U.S. Cl.
CPC ...... *C10G 7/003* (2013.01); *C10G 7/12* (2013.01); *C10G 71/00* (2013.01); *C10G 2300/4081* (2013.01); *C10G 2300/301* (2013.01); *C10G 2300/308* (2013.01); *C10G 2300/44* (2013.01); *C10G 2400/10* (2013.01); *C10G 2300/1003* (2013.01)
USPC ........... 208/184; 208/179; 208/348; 208/361; 208/364; 203/73; 203/78; 203/88; 203/94

(58) Field of Classification Search
USPC ......... 208/179, 184, 187, 348, 361, 364, 365; 210/806; 203/71, 73, 78, 80, 84, 88, 203/91, 94, 98
See application file for complete search history.

(56) References Cited

U.S. PATENT DOCUMENTS

| | | | |
|---|---|---|---|
| 3,173,859 | A | 3/1965 | Chambers |
| 3,625,881 | A | 12/1971 | Chambers |
| 3,923,644 | A * | 12/1975 | Hindman .................... 208/186 |
| 4,021,333 | A | 5/1977 | Habiby et al. |

(Continued)

OTHER PUBLICATIONS

"Standard Guide for Characterizing Hydrocarbon Lubricant Base Oils," The American Society for Testing and Materials, ASTM D-6074-99, Apr. 1999 (earlier cited in an IDS filed Mar. 8, 2005 in parent U.S. Appl. No. 11/076,436).

(Continued)

*Primary Examiner* — Renee E Robinson
(74) *Attorney, Agent, or Firm* — Jackson Walker L.L.P.; Christopher J. Rourk

(57) ABSTRACT

A method for recovering base oil from waste lubricating oil by separating base oil range constituents from a waste lubricating oil mixture, thereafter separating higher quality base oil constituents and lower quality base oil constituents from the base oil recovered from the waste lubricating oil mixture and thereafter treating the lower quality base oil constituents to produce marketable base oil. The total base oil produced from a waste lubricating oil mixture by this process is greater than the quantity producible by previous processes using only base oil separation from the waste lubricating oil mixture or processes which use only treatment of the base oil recovered from the waste lubricating oil mixture to produce the product base oil.

26 Claims, 5 Drawing Sheets

(56) References Cited

U.S. PATENT DOCUMENTS

| | | |
|---|---|---|
| 4,033,859 A | 7/1977 | Davidson et al. |
| 4,071,438 A | 1/1978 | O'Blany |
| 4,101,414 A | 7/1978 | Kim et al. |
| 4,151,072 A | 4/1979 | Nowack et al. |
| 4,169,044 A | 9/1979 | Crowley |
| 4,233,140 A | 11/1980 | Antonelli et al. |
| 4,302,325 A | 11/1981 | Fletcher et al. |
| 4,342,645 A | 8/1982 | Fletcher et al. |
| 4,360,420 A | 11/1982 | Fletcher et al. |
| 4,399,025 A | 8/1983 | Fletcher et al. |
| 4,431,524 A | 2/1984 | Norman |
| 4,432,856 A | 2/1984 | Murakami et al. |
| 4,512,878 A | 4/1985 | Reid et al. |
| 4,894,140 A | 1/1990 | Schon |
| 4,941,967 A | 7/1990 | Mannetje et al. |
| 5,028,313 A | 7/1991 | Kalnes et al. |
| 5,045,179 A | 9/1991 | Langhoff et al. |
| 5,049,258 A | 9/1991 | Keim et al. |
| 5,102,531 A | 4/1992 | Kalnes et al. |
| 5,143,597 A | 9/1992 | Sparks et al. |
| 5,242,579 A | 9/1993 | Mead et al. |
| 5,244,565 A | 9/1993 | Lankton et al. |
| 5,302,282 A | 4/1994 | Kalnes et al. |
| 5,306,419 A | 4/1994 | Harrison et al. |
| 5,362,381 A | 11/1994 | Brown et al. |
| 5,382,328 A | 1/1995 | Drespa et al. |
| 5,384,037 A | 1/1995 | Kalnes |
| 5,447,625 A | 9/1995 | Roe |
| 5,632,867 A | 5/1997 | Davis et al. |
| 5,707,510 A | 1/1998 | Berry |
| 5,759,385 A | 6/1998 | Aussillous et al. |
| 5,795,462 A | 8/1998 | Shurtleff |
| 5,814,207 A * | 9/1998 | Kenton .................. 208/184 |
| 5,871,618 A | 2/1999 | Lee et al. |
| 5,885,444 A | 3/1999 | Wansborough et al. |
| 5,904,838 A | 5/1999 | Kalnes et al. |
| 5,980,698 A | 11/1999 | Abrosimov et al. |
| 6,007,701 A | 12/1999 | Sherman et al. |
| 6,106,699 A | 8/2000 | MacDonald et al. |
| 6,117,309 A | 9/2000 | Daspit et al. |
| RE36,922 E | 10/2000 | Sparks et al. |
| 6,132,596 A | 10/2000 | Yu |
| 6,174,431 B1 | 1/2001 | Williams et al. |
| 6,179,999 B1 | 1/2001 | Sherman et al. |
| 6,238,551 B1 | 5/2001 | Sherman et al. |
| 6,292,737 B1 | 9/2001 | Higashimata et al. |
| 6,319,394 B2 | 11/2001 | Sherman et al. |
| 6,320,090 B1 | 11/2001 | Sherman et al. |
| 6,372,122 B1 | 4/2002 | Gorman |
| 6,398,948 B1 | 6/2002 | Sherman et al. |
| 6,402,937 B1 | 6/2002 | Shaffer, Jr. et al. |
| 6,440,298 B1 | 8/2002 | Shurtleff |
| 6,512,147 B2 | 1/2003 | Inaba et al. |
| 6,592,748 B2 | 7/2003 | Cody et al. |
| RE38,366 E | 12/2003 | Kenton |
| 6,712,954 B1 | 3/2004 | Pohler et al. |
| 6,805,062 B2 | 10/2004 | Shurtleff |
| 6,929,737 B2 | 8/2005 | Sherman et al. |
| 7,226,533 B2 | 6/2007 | Angulo Aramburu |
| 7,261,808 B2 | 8/2007 | Grandvallet et al. |
| 7,267,760 B2 | 9/2007 | Sherman et al. |
| 2001/0001198 A1 | 5/2001 | Sherman et al. |
| 2001/0025807 A1 | 10/2001 | Sherman et al. |
| 2002/0025807 A1 | 2/2002 | Zimmerman et al. |
| 2002/0036158 A1 | 3/2002 | Austin |
| 2004/0011704 A1 | 1/2004 | Shurtleff |
| 2008/0000808 A1 | 1/2008 | Sherman et al. |

OTHER PUBLICATIONS

"Engine Oil Licensing and Certification Systems Specification," American Petroleum Institute, API 1509, 14th Edition, Dec. 1996 (earlier cited in an IDS filed Mar. 8, 2005 in parent U.S. Appl. No. 11/076,436).

Indian Patent Office; Office Action; Indian Patent Application No. 6941/DELNP/2007; Mar. 22, 2013, 5 pages.

Indian Patent Office; Response to Office Action; Indian Patent Application No. 6941/DELNP/2007; Mar. 20, 2014, 6 pages.

* cited by examiner

METHOD FOR PRODUCING BASE LUBRICATING OIL FROM WASTE OIL

CROSS-REFERENCE TO RELATED APPLICATION

This application is continuation of prior application Ser. No. 12/421,002, filed Apr. 9, 2009, which is a divisional application of prior application Ser. No. 11/076,436, filed Mar. 8, 2005, both of which applications are hereby incorporated herein by reference, in their entirety.

FIELD OF THE INVENTION

The present invention relates to producing marketable base oil from waste oil by a process comprising separating base oil range constituents from the other components of the waste oil, thereafter separating the high quality base oil constituents from lower quality base oil constituents to produce a first high quality marketable grade base oil and a second lower quality base oil stream, then treating the lower quality base oil stream to produce a second marketable grade base oil product. The total base oil yield of the first and second products and fraction of high quality base oil produced from the waste oil by this process is greater than the quantity producible by previous processes.

BACKGROUND OF THE INVENTION

This invention relates to a high efficiency method for refining waste oils to produce base oil and other valuable products, which includes the steps of separating at least a portion of the base oil constituents (base oil fraction), typically mineral oil suitable for lubrication service with a boiling point usually between 500 and 1100° F., from the various physical contaminants and other hydrocarbon fractions of the waste oil, separating from the base oil fraction a portion of the lower quality molecules such as those containing hetero atoms, unsaturates, polars and aromatics, thereby creating a first high quality marketable base oil stream and a stream wherein the lower quality molecules have been concentrated and thereafter further treating the lower quality base oil stream to at least partially convert the constituents containing hetero atoms, unsaturates, polars and aromatics to higher quality molecules by removing sulfur, oxygen, nitrogen, chlorine constituents and the like and more fully saturating the molecules thereby producing a second marketable quality base oil stream.

Annually large volumes of finished lubricating oils are produced worldwide. Finished lubricating oils are produced by combining base oil (also known as base stock, base lube stock, lube stock, lube oil, lubrication oil and the like) typically a mineral oil with between 18 to 40 carbon atoms and a boiling point between 500 to about 1050° F. with chemical additives which enhance the properties of the base oil making it more suitable for its intended service. The quality, quantity and type of base oil used depend upon the service for which the finished lubricating oil is made.

The quality of the base oil component is typically determined by several factors related to the oil's compositional and physical properties. The American Society for Testing and Materials (ASTM) has compiled *ASTM D-6074-99 Standard Guide for Characterizing Hydrocarbon Lubricant Base Oils* as a guide for testing the quality of base oil. Similarly, the American Petroleum Institute (API) has prepared *Specification API* 1509, *Engine Oil Licensing and Certification Systems Specification* in order to help quantify and categorize base oil quality. The compositional properties relate to actual chemical composition of the base oil, such as the presence of certain contaminants other than hydrogen and carbon in the base oil molecules and the configuration, form or structure of the base oil molecules. The physical properties relate to the performance of the base oils when tested in predefined ways and include such properties as viscosity, flash point, volatility and the like.

API 1509 currently has designated six classifications ("Groups") of base oil. Groups I, II and III typically classify base oils in accordance with their physical and compositional properties. Groups IV, V and VI typically classify base oil by type; include synthetic oils and the like. Mineral oils derived from waste oil will typically be classified in Groups I, II or III. These Groups are principally distinguished by the concentration of sulfur, percent saturates and viscosity index.

Typically, base oils and finished lubricating oils, by usage and/or handling, become contaminated with oxidation and degradation products, water, fuels, solvents, antifreeze, other oils, fine particulates, additive products and the like. Service can also result in changes in the molecular structure of the oil and/or the chemical additives thereby changing the original nature of the oil. These contaminants or changes may reduce the desired performance of the oils or render the oils unsuitable for use in their intended services and necessitate disposal or replacement with new, uncontaminated oil. Once deemed unfit for use or service, these contaminated oils are typically called waste oil or used oil. Waste oil can be either petroleum or synthetically based oil, that may or may not have been in service and include oils that typically are used as lubricants for engines, turbines and gears, hydraulic fluids, metal working fluids, insulating or cooling fluids, process fluids or the like.

Waste oil is typically collected by a large number of regional waste oil gatherers who collect it from the local sites of utilization or production. In the collection process, a great variety of oils, which were formulated for numerous types of service, are mixed together thereby forming a composite of different types and qualities of base oil, chemicals, contaminants and the like.

With the ever-increasing desire to conserve and manage our petroleum resources in a responsible way, there is renewed focus on the need to recover and re-refine waste oils to recover the base oil contained therein. Currently, the vast majority of the collected waste oil is combined with industrial fuel oils and burned as a combustion fuel. This practice not only contributes significant pollutants to the environment, but also wastes energy and contributes to our dependence on foreign oil. Those most familiar with the problem, including the U.S. Environmental Protection Agency and the American Petroleum Institute, have recognized that re-refining to produce base oil is the highest and best use of the waste oil and the industry has long sought an efficient, economic and environmentally friendly process which is capable of recovering a high percentage of the base oil from the waste oil (high efficiency) and producing a high percentage of high quality products therefrom (high quality).

Several treatment processes have been proposed for creating cleaner burning fuel oils or diesel oils from the waste oil which employ various forms of processing including; thermal cracking U.S. Pat. Nos. 5,362,381, 5,382,328, 5,885,444; distillation U.S. Pat. Nos. 4,101,414, 4,342,645, 5,306,419, 5,814,207, 5,980,698, RE38,366; pyrolysis U.S. Pat. No. 6,132,596; coking U.S. Pat. Nos. 5,143,597, RE36,922 and the like. However, creating fuel oils is not the highest and best use for the waste oil since the energy and intense processing that was undertaken to originally produce the base oil from crude oil or through synthesis processes is lost when the oil is consumed by combustion. Furthermore, the resource itself is lost. Hence, waste oil burning does not fully meet the ultimate objectives of conservation and recovery.

The ideal re-refining process would produce a high percentage of base oil, produce high quality products—both base oil and byproducts, be environmentally friendly and economically viable and commercially sound. While several processes have been proposed for re-refining waste oil into base oil, none are currently capable of meeting all the desired objectives as effectively as the method described hereinafter.

For example, waste oil has long been re-refined to base oil using sulfuric acid to separate contaminants from useful hydrocarbon components followed by treatment with clay, however, few facilities of this type remain due to poor base oil product quality and the generation of large amounts of highly toxic, environmentally hazardous, acid and clay sludge. This type of process has been banned from use in many westernized countries because of these shortcomings.

Waste oils have also been re-refined to base oil utilizing a process known as hydrotreating or hydrofinishing. Several patents describe various derivatives of the process including U.S. Pat. Nos. 4,431,524; 4,432,856; 4,512,878; 4,941,967; 5,045,179 and 5,447,625. This treatment method typically employs some form of distillation to separate a base oil fraction from other contaminants, followed by treatment with hydrogen at elevated temperatures and pressures over a catalyst. While this method has been successful in saturating some aromatics and non-saturated compounds, severe hydrotreating (higher temperatures, pressures, hydrogen concentrations, residence time, etc) is required to sufficiently saturate oil molecules and achieve the physical and compositional properties of higher quality base oils. Unfortunately, these severe processing conditions can result in molecular cracking, which consequently results in base oil yield loss thereby lowering the amount of base oil produced. Therefore, this process is not capable of producing both high quality products (high quality) and high quantity yields (high efficiency). Further, hydrotreating all the base oil fraction is expensive typically resulting in marginal economics.

Another method of re-refining waste oil to base oil utilizes solvent extraction. This process also suffers from a yield/quality trade-off. U.S. Pat. Nos. 4,021,333; 4,071,438; 4,360,420; 6,117,309; 6,319,394; 6,320,090 and 6,712,954 describe various processes involving some form of distillation followed by solvent extraction. U.S. Pat. Nos. 4,302,325 and 4,399,025 describe extraction processes on base oil fractions, however derived. In these processes, a portion of the contaminated base oil molecules (polars, aromatics, heteroatoms, unsaturates) are separated from the base oil fraction using liquid/liquid extraction. This creates a purified base oil stream (raffinate) and an extract oil stream (extract) wherein some of the contaminated molecules are concentrated. The efficacy of separation of quality base oil from contaminated molecules is determined by several variables including temperature, treatment ratio, residence time, contact, and the presence of other fluids added to the oil and solvent. In the extraction process there is continual trade-off between selectivity (the amount of good base oil taken with the extract) and purity (percent of contaminated base oil molecules left in the raffinate).

Typically solvent extraction processes are effective at removing some of the aromatics, polars and unsaturated compounds. However, to reach the desired level of purification necessary for higher quality standards using known processes, the selectivity of the solvent must be reduced whereby both contaminated molecules as well as good molecules are taken by the solvent, which significantly reduces the yield of base oil. Therefore, there is an inherent trade-off between quality and yield so that in order to get high quality base oil, yield quantity may be reduced (see U.S. Pat. No. 6,712,954).

As previously noted, known processes of this type are capable of producing either high quality or high yield, but not both. This is due to the nature of the waste oil, which consists of a wide variety of types, qualities and contaminants and the consequential trade-off between quality and quantity that is typically inherent in these processes. Furthermore, most known process of this type typically can only produce a Group I base oil. An additional disadvantage of this process is that the extract formed by solvent extraction of waste oil is also prone to reformation assumed to be polymerization. This polymerization is believed to be catalyzed by acid and can be reduced through addition of base or blending with fuel oil or other anti-polymer chemicals thereby adding to the overall production cost. Furthermore, the resulting product is a low quality base oil, which may be difficult to market.

SUMMARY OF THE INVENTION

According to the present invention, a method for efficiently producing a high yield of high quality base oil from a waste oil comprises: separating at least a portion of the base oil constituents from the waste oil to produce a base oil fraction; treating the base oil fraction to separate the base oil fraction into a high quality base oil stream and a lower quality base oil stream; and, treating the lower quality base oil stream to improve or remove undesirable constituents of the lower quality base oil stream thereby upgrading the lower quality base oil stream to a marketable quality base oil stream.

The invention further comprises a method for producing a highly purified base oil stream wherein the high quality base oil stream produced above is further treated to upgrade or remove undesirable constituents and increase the degree of saturation thereby producing a highly purified base oil that has a wider potential market for use and value. The highly purified base oil can be made to white oil quality thereby becoming suitable for use in the pharmaceutical and food processing industries as well as being suitable as a high quality base stock for use in high quality or specialty lubricants.

The invention still further comprises a method for efficiently producing a highly purified base oil from a waste oil, the method comprising: separating at least a portion of the base oil constituents from the waste oil to produce a base oil fraction; treating the base oil fraction to separate it into a high quality base oil stream and a lower quality base oil stream; and treating the high quality base oil stream to upgrade or remove undesirable constituents to create a highly purified base oil. The highly purified base oil stream is typically API Group II or Group III quality.

The invention further comprises a method for efficiently producing ultra high quality base oil from a waste oil, the method comprising; separating at least a portion of the base oil constituents from the waste oil to produce a base oil fraction; treating the base oil fraction using the severe solvent extraction described herein, to separate it into an ultra high quality base oil stream and a lower quality base oil stream. By this method it is possible to produce an API group III base oil which is suitable for use in high quality and specialty lubricants.

The invention further comprises a method for separating a liquid stream comprising a plurality of constituents of varied boiling points by in-situ flash distillation in at least one distillation zone to produce at least one overhead stream and at least one bottom stream, the method comprising: passing the liquid stream into a heated liquid layer contained in a distillation zone and producing an overhead stream and a bottom stream; continuously heating the liquid layer in the distillation zone to a temperature sufficient to vaporize a portion of the liquid feed stream thereby producing a bottom stream and a vaporized distillate stream; passing a portion of the overhead stream out of the distillation zone; passing a portion of the heated bottom stream to use as a charge liquid stream to another distillation zone or to use as a product stream.

The invention further comprises a system for separating a liquid stream comprising a plurality of constituents of varied boiling points by in-situ flash distillation; the method comprising: charging the liquid stream into a heated liquid layer in a flash vessel having at least a top and a bottom, a liquid stream inlet, a distillate outlet near the top of the vessel, a lower portion and a bottom stream outlet near the bottom of the vessel, the vessel containing a heated liquid layer in its lower portion, to produce an overhead stream through the overhead outlet and a bottom stream from the bottom stream outlet; continuously heating the bottom stream from the flash vessel to produce a heated bottom stream and passing a portion of the heated bottom stream back to the liquid layer in the flash distillation zone.

DESCRIPTION OF PREFERRED EMBODIMENTS

Figure 1:
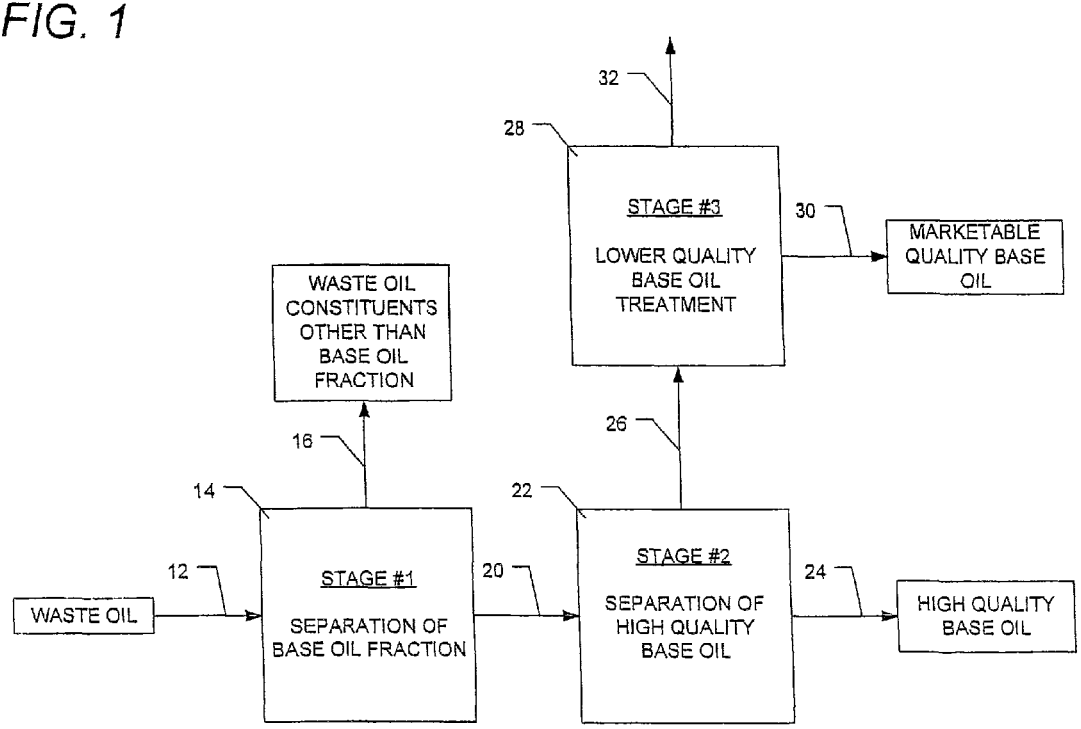
FIG. 1. is a generalized schematic of the process of the present invention.

In FIG. 1, a generalized embodiment of the present invention is shown. In the embodiment shown, a waste oil stream 12 is charged to a base oil separation zone 14 where a portion of the base oil constituents (base oil fraction), line 20, is separated from the other physical contaminants, line 16, in the waste oil. In actual practice, the various physical contaminants are typically removed from the base oil fraction in such a way as to produce more than one stream but for simplicity are shown herein to be separated collectively and recovered through line 16 and may include low molecular weight materials such as light hydrocarbons, water, glycols and the like typically having a boiling range generally below about 500° F., although it may be desirable to include all materials below 650° F., and high molecular weight materials and materials with low volatility including, particulates, polymers, salts and the like typically having a boiling point greater than about 1050° F. The base oil fraction recovered through a line 20 typically consists of hydrocarbon molecules suitable for use or manufacture into base oil typically with 18 to 40 carbon atoms and having a boiling range between about 500 to about 110° F. In a high quality base oil separation zone 22, a portion of the higher quality base oil molecules (high quality base oil) is separated from the lower quality base oil molecules (lower quality base oil) and recovered through a line 24 for sale as product base oil. This high quality base oil typically meets at least one of Groups I, II or III as set forth by API 1509. The lower quality base oil is recovered through a line 26 and passed to a lower quality base oil treatment zone 28 where it is more fully saturated and treated for the removal of various elemental contaminants which are recovered through a line 32, to produce a marketable quality base oil which meets the requirements of at least one of API 1509, Group I, II or III which is recovered through a line 30. Various materials contaminants, derivatives and products thereof and the like are recovered via a line 32. This is a relatively generalized showing of the process of the present invention. However, it shows an important feature of the present invention.

In the first stage, zone 14, the base oil fraction is separated from physical contaminants in the waste oil. Typically, such contaminants include water, light hydrocarbons, solvents, solids, polymers, high molecular weight hydrocarbons, lubricating oil additives, chemicals, salts and the like. Several processes or combination of processes can be used to effect this separation including various forms of extraction, distillation, filtration, centrifugation, absorption and adsorption and the like as known to those skilled in the art. Typically, the separation will take place based upon differences in the physical or chemical properties of the base oil fraction and the various contaminating materials.

In the second stage, the oil base fraction is then fed to zone 22 of the process where a portion of the lower quality base oil molecules are separated. These molecules may comprise polars, aromatics, olefins, unsaturates, heteroatoms and the like, which are separated from the higher quality base oil molecules, which are typically saturated, paraffinic and non-aromatic. The higher quality base oil molecules in line 24 are a high quality base oil stream typically having a percent of saturates greater than 90% and a sulfur content less than about 0.3 weight percent. The stream in line 26 will typically have a higher concentration of sulfur, oxygen, nitrogen, olefins, aromatics and the like. Various processes or combinations thereof can be used to effect separation of these materials from the high quality base oil. These processes include various forms of extraction, filtration, ultrafiltration, absorption, adsorption, molecular sieves and the like, as known to those skilled in the art.

In the third stage, this stream is processed in zone 28 by hydrogenating, alkylating, molecular reforming, molecular substituting or the like or a combination thereof, as known to those skilled in the art to remove undesirable elements such as sulfur, nitrogen, oxygen and the like and increase the percent saturation of at least a portion of the hydrocarbon molecules in the lower quality base oil stream. The resulting base oil produced through line 30 is typically of a quality sufficient to meet the requirements for Groups I, II, or III of API 1509.

Figure 2:
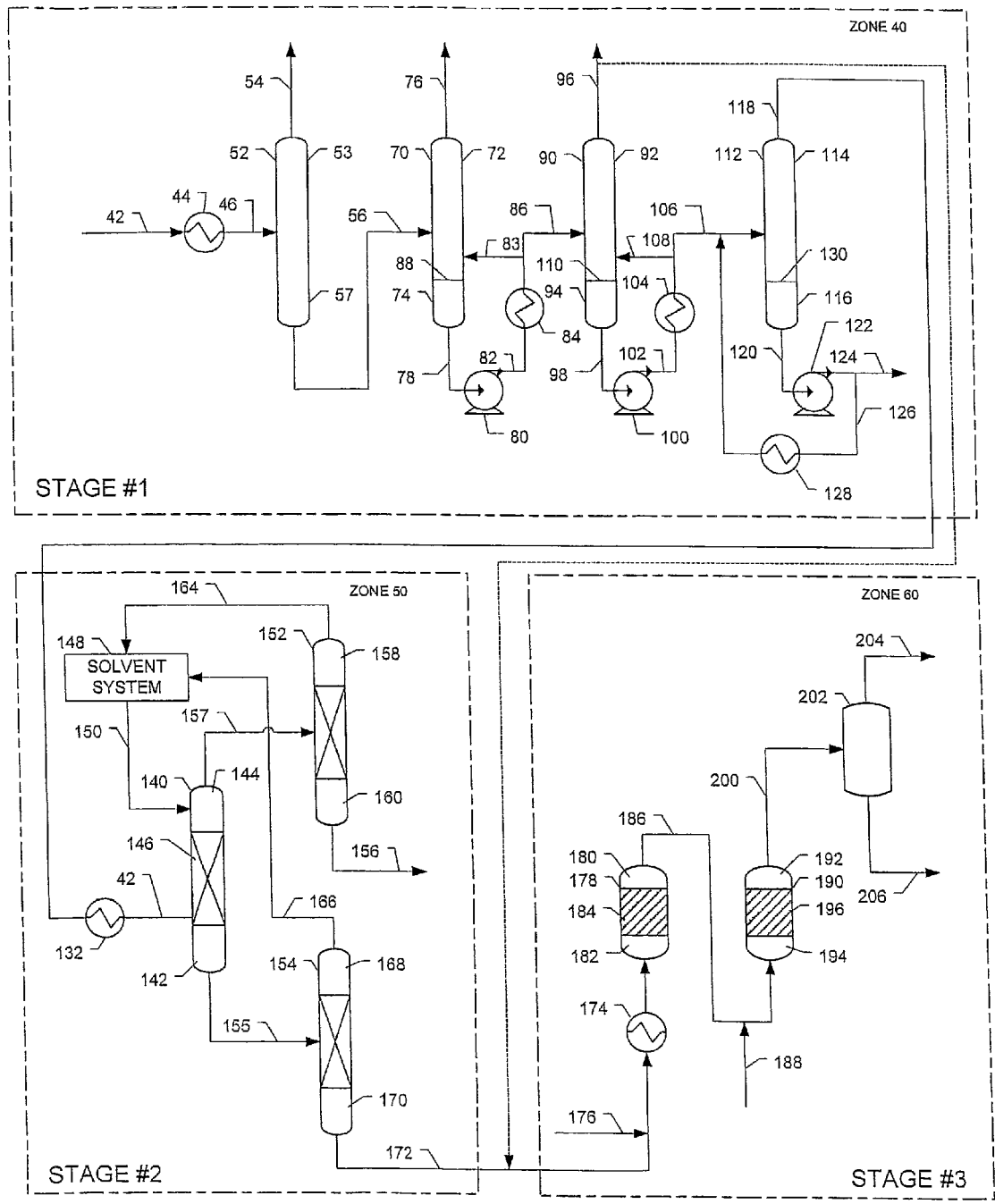
FIG. 2. is a schematic diagram of a preferred distillation process, combined with a solvent extraction process and a hydrogenation process in an embodiment of the invention.

FIG. 2 shows an embodiment of the invention. In stage 1 a flash distillation system zone 40 is shown for separating the base oil fraction from the other components of the waste oil stream. A waste oil stream is charged through a line 42 through a heater 44 and a line 46 to a first flash distillation vessel 52. Flash distillation vessel 52 includes a top 53 and a bottom 57 and includes a distillate outlet line 54 and a bottom outlet line 56. A distillate stream having a boiling point range up to about 350° F. is recovered via line 54 and passed to use as a fuel or the like. A bottom stream is withdrawn via bottom outlet line 56 and passed to a second in-situ flash distillation vessel 70.

In-situ flash distillation vessel 70 includes a top 72 and a bottom 74 with a distillate outlet line 76 positioned to recover a distillate stream from the top 72 and a bottom outlet line 78 for recovering a portion of a liquid layer maintained in the lower portion of vessel 70 at a liquid level shown at 88. The stream recovered from line 76 has a boiling range generally from about 350 to about 500° F. and is typically used for fuel and the like. The bottom stream recovered through line 78 is passed to a pump 80 and then through a feed inlet line 82 and a heater 84 and returned through line 83 to vessel 70. A portion of the heated bottom stream in line 82 is withdrawn through a line 86 and fed to a third in-situ flash distillation vessel 90.

In-situ flash distillation vessel 90 includes a top 92 and a bottom 94 and a distillate recovery outlet 96 through which distillate is recovered through the top portion of vessel 90. A bottom stream 98 is recovered from the bottom of vessel 90 and passed via a line 98 through a pump 100 and to a line 102 and passed via a heater 104 to line 108 as a return stream to vessel 90. A portion of stream 102 is passed through a line 106 as a feed to a fourth flash distillation vessel 112. A liquid layer having a liquid level 110 is maintained in the lower portion of vessel 90. Vessel 90 produces a distillate stream having a boiling range from about 500 to about 650° F.

The return streams for vessels 70 and 90 are used to maintain the temperature in the liquid layer in the bottom of the vessels. The oil fed into vessels 70 and 90 is heated to the temperature necessary to effect the desired separation of the distillate by direct contact with the liquid layer in the bottom of the vessels.

Vessel 112 includes a top 114, a bottom 116 and receives feed from vessel 90 via a line 106. This vessel produces a distillate stream through a distillate outlet 118 having a temperature from about 650 to about 1050° F. A liquid level is also maintained in this vessel at a level shown at 130. The bottom stream is withdrawn through a line 120, passed via pump 122 to a discharge line 124 through which a portion of this stream is recovered as a product. A portion of this stream is also returned via a line 126 and a heater 128 to join the feed stream in inlet line 106. This heated bottom steam 126 is used to maintain the desired feed temperature to vessel 112.

The product stream recovered through line 124 typically comprises asphalt range materials and includes polymers, high boiling point hydrocarbons, salts, solids, other high boiling range materials, typically having a boiling, point greater than 1050° F., and the like which are included in the waste oil stream 42 in FIG. 1.

Vessel 112 may well be a vacuum distillation vessel if required to prevent degradation of the base oil stream in this vessel. Steam or gas stripping may also be used in this vessel to enhance distillation.

The distillate stream recovered from vessel 112 through line 118 is passed to stage 2, zone 50, a solvent extraction section. The stream in line 118 is passed through a heat exchanger 132 and to a solvent treating vessel 140. This solvent treating vessel is shown with a top 144 and a bottom 142. A contact section 146 is shown schematically in the center portion of the vessel. A solvent processing and storage system is shown at 148 and supplies solvent to an upper portion of vessel 140 near its top via a line 150. The solvent typically moves downwardly, counter-currently to the oil, which is introduced near the bottom of contact section 146. The high quality base oil molecules are recovered with a portion of the solvent from the top of vessel 140 and passed via a line 157 to a vessel 152 having a top 158 and a bottom 160 where the solvent is separated from the base oil and the base oil is passed via a line 156 to product. This stream is high quality oil, which typically will meet the requirements for Group I, II or III as specified by API 1509.

The solvent is recovered through a line 164 and returned to the solvent processing and storage system where it is typically treated to remove water, low boiling point contaminants, neutralize acidity and the like as known to those skilled in the art and returned to solvent storage ready for repeated use. A bottom stream 155 is recovered from base oil separation vessel 140 and passed to a solvent separation vessel 154 having a top 168 and a bottom 170. Solvent is separated from the lower quality base oil in this vessel, typically by distillation and passed via a line 166 back to the solvent processing and storage system 148. The lower quality base oil recovered from the bottom of vessel 154 is passed via a line 172 to the third stage, zone 60, a hydrogenation section.

In the hydrogenation section, hydrogen is added to stream 172 via line 176 as shown. The stream is then passed through a heater 174 and into a vessel 178, which acts as a guard bed to remove contaminants in the oil that might otherwise poison the hydrotreating catalyst. This vessel has a top 180 and bottom 182 and includes a contact zone 184 containing a catalyst, spent catalyst, activated clay or the like as know to those skilled in the art. It will be understood that hydrogen could be injected into line 172 at a plurality of points or into vessel 178 at a plurality of points. The product from vessel 178 is recovered through a line 186 and passed to a hydrogenation reactor vessel 190.

Vessel 190 has a top 192, a bottom 194 and includes a catalytic bed 196. Hydrogen may be added at various points along line 186 as shown by a line 188 or at various points along the length of vessel 190. To some extent, the olefins and molecules containing contaminants such as sulfur, nitrogen, oxygen, hetroatoms and the like are hydrogenated forming more saturated hydrocarbon molecules and volatile compounds of hydrogen. The product stream is recovered through a line 200 to a vessel 202 where volatile materials containing most of the contaminants are flashed via a line 204 and passed to use as fuel, discharged after suitable treatment to the atmosphere or the like. The lower quality oil, which has now been upgraded, is recovered through a line 206. This oil is typically suitable for sale as base oil under Group I, II or III of API 1509.

In the practice of the present invention, it may be desirable in some instances to chemically treat the waste oil with a base or alkali material such as sodium carbonate, sodium bicarbonate, sodium hydroxide, potassium hydroxide, or the like as known to those skilled in the art in heater 44. This step conditions, stabilizes and otherwise neutralizes the waste oil stream to reduce the tendency to foul, to facilitate separation of the waste oil stream into its constituent parts and to enhance the quality of the non-base oil products. In certain instances it may also be desirable to add an alkali or base to one or more of the distillation vessels either in the feed stream, recycle stream or directly into the vessel.

In the embodiment described above, four vessels are used to separate the base oil fraction from the other waste oil constituent. In the practice of this invention it may be desirable to use as few as two vessels or as many as eight vessels to effect this separation.

In the embodiment described above, flash vessels are used to separate various constituents from the base oil fraction. These vessels include any vessel or system that affects a single stage of separation including simple evaporators, thin or wiped film evaporators, columns, vessels, tanks, pipes and the like as known to those skilled in the art.

In the embodiment described above steam or a gas may added to vessels 52, 70, 90 and 112 to help strip the tight distillates from the waste oil thereby enhancing separation. Steam stripping is well known to those in the art as a means of enhancing distillation processes.

In vessel 52, no heated recycle bottom stream is used because it is possible to heat the inlet feed stream in heater 44 to a desired temperature without unusual concern for fouling. This vessel could be operated in the same fashion as vessel 70 by heating and returning a portion of the bottom stream in line 56 to vessel 52 and maintaining a bottom layer in vessel 52.

In the practice of the present invention, it may be desirable in some instances to bring the stream recovered through line 96, which has a boiling range typically from about 500 to about 650° F. into combination with the stream in line 172 for hydro-treatment since this stream is suitable for use as base oil. This stream is not used in all instances for a supplement to the stream in line 172 but may be used if desired. The boiling point range of the material recovered through line 96 can be modified if desired to produce material having a slightly higher initial boiling point or the like. This stream is also useful as base oil but in prior processes has not been recovered in many instances.

The embodiment for stage 2 described above applies to solvents that have a specific gravity greater than the base oil. In cases where the solvent has a specific gravity less than base oil the solvent would be introduced into the solvent treating vessel in the bottom and the base oil would be introduced into the top of the vessel. Vessels 152 and 154 would still be configured to remove solvent from the raffinate and extract respectively.

While FIG. 2 shows one guard bed, vessel 178, and one hydrogenation reactor, vessel 190, two or more guard beds, configured in series or in parallel, could be used prior to vessel 190. The guard beds in parallel would be operated one at a time to enable regeneration or clean out and recharging of either of the vessels without interrupting flow to vessel 190. Similarly, more than one hydrogenation reactor could be operated in series or parallel to enhance operation.

In the embodiment described above it may also be desirable to incorporate a hydrogen recovery system to recover hydrogen from process stream 204. The hydrogen recovery system would purify and recover the hydrogen in this stream and recycle it back for use in stream 176 and/or 188.

It may also be desirable to employ steam or gas stripping in vessel 202 to help strip non-base oil light contaminates from the base oil. An additional vessel could also be added to further process the base oil in line 206 by further fractionating it to create different viscosity cuts ors tripping it to reduce volatility.

In the embodiment described above in stage two is used to separate a portion of the higher quality base oil molecules from the lower quality base oil molecules thereby creating a first high quality base oil stream 156 wherein the concentration of aromatics, polars, unsaturates, heteroatoms and the like is lower and a second tower quality base oil stream 172 wherein the concentration of aromatics, polars, unsaturates, heteroatoms and the like is higher. It is also possible to further upgrade the high quality base oil stream using processes similar to those described in stage 3, by converting a portion of the aromatic, polar, unsaturated, heteroatom molecules and the like remaining in the high quality base oil stream, to higher quality molecules thereby further purifying it, increasing the degree of saturation and thereby producing an highly purified base oil. This oil may be suitable for use as a white oil in the medicinal or food processing industries as well as a lubricating base oil in the industrial lubrication markets.

In the embodiment shown above, the solvent recovered from the lower and high quality base oils, streams 164 and 166, is combined and purified in the solvent processing and storage unit by removing water and other low boiling point contaminants prior to re-use. The solvent can also be treated at this stage with bases and the like as known to those skilled in the art, to neutralize organic acids that may have built up in the solvent.

In the embodiment of the present invention as discussed above, a flash distillation system is used to separate the base oil fraction from the other waste oil constituents. The treated waste oil stream is heated to between 250 and 450 F and preferably to between 300 and 400° F. in heater 44 and flashed across a valve (not shown) into flash distillation vessel 52 where a distillate stream 54 is recovered from the waste oil. The distillate stream typically will be burned as a process gas or condensed, separated from any water, glycols and the like, and used as a fuel or the like. The bottom waste oil outlet stream is passed or pumped to in-situ flash distillation vessel 70 wherein it passes into a pool of oil resident in the bottom of the vessel. The pool of oil is kept at a temperature between 400 and 600° F. and preferably between 450 and 550° F. by heating it through a recirculation heater whereby the oil is pumped from the bottom of vessel 70, heated in heater exchanger 84 and passed back into vessel 70. Typically, the flow rate of this recirculation stream is sufficient to provide adequate heat exchange in heater exchanger 84 to keep the liquid layer (pool of oil resident in the bottom of the vessel) at the desired temperature, thereby creating the desired distillate fraction 76, and maintaining turbulent flow and a high Reynolds number through the tubes of heater 84.

The waste oil stream entering vessel 70 from vessel 52 is heated by direct contact with this liquid layer thereby vaporizing constituents of the waste oil with a boiling point less than the temperature of the liquid layer and creating distillate stream 76. Distillate stream 76 typically has a boiling range generally from about 350 to about 500° F. and is typically condensed and used for fuel and the like. A portion of the bottom stream in line 82 is passed to a third in-situ flash distillation vessel 90.

Vessel 90 operates on a similar principal as vessel 70 using a hot liquid layer to heat the incoming stream by direct contact. The liquid layer of oil is kept at a temperature between 550 and 750° F. of and preferably between 600 and 700° F. by heating it through a recirculation heater 100 whereby the oil is pumped from the bottom of vessel 90, heated in the heater 100 and passed back into vessel 90. A portion of the recirculation stream 82 is passed to flash distillation vessel 112. A liquid layer having a liquid level 110 is maintained in the lower portion of vessel 90. Vessel 90 produces a distillate stream 96 having a boiling range from about 500 to about 650° F.

In the embodiment described above vessels 52, 70 and 90 are operated at atmospheric pressure. These vessels could also be operated at pressure or under vacuum as known to those skilled in the art, to effect similar separation of the base oil fraction from the waste oil.

Vessel 112 is typically a flash distillation vessel, which is operated under vacuum ranging from full vacuum to 500 mmHg and preferable between 2 and 30 mmHg. The feed stream 106 from vessel 90 is combined with a recirculation stream 126 from the bottom of vessel 112 which has been heated to between 550 and 700° F. and preferably between 600 and 650° F. whereby the mass ratio is between 1:2 to 1:40 feed stream flow rate to the recirculation stream flow rate and preferably between 1:10 and 1:20. A distillate stream is produced and passes through a distillate outlet 118 having a boiling point range from about 650 to about 1050° F. A liquid level 130 is also maintained in vessel 112. The bottom stream is withdrawn through a line 120, passed via pump 122 to a discharge line 124 through which a portion of this stream is recovered as a product. A portion of this stream is also returned via a line 126 and a heater 128 to join the stream in inlet line 106. This heated bottom stream is used to maintain the desired feed temperature to vessel 112.

In the embodiment shown above it may be advantageous to add a stripping gas such as steam to one or more of vessels 52, 70, 90 and 112 to strip light components from the oil and aid the distillation and separation process. The stripping gas may be added at various points in the bottom half of the vessel or to the oil feed stream to these vessels.

The extraction process used in vessel 140 may be any separation process known to those skilled in the art for the separation of high quality base oil molecules from lower quality base oil molecules. Such processes include solvent extraction, with materials such as ethanol, diacetone-alcohol, ethylene-glycol-mono(low alkyl)ether, di-ethylene-glycol, diethylene-glycolmono(low alkyl)ether, o-chlorophenol furfural, acetone, formic acid, 4-butyrotacetone, low-alkyl-ester of low mono- and dicarbonic acids, dimethylformamide, 2-pyrrolidone and N-(low alkyl)-2-pyrrolidone, N-methyl-2-pyrolodone, epi-chlorohydrin, dioxane, morpholine, low-alkyl- and amino(low-alkyl)morpholine, benzonitrile and di-low-alkyl)sulfoxide and phosphonate and the like.

N-methyl-2-pyrolodone is a preferred solvent for the process of the present invention. In a preferred embodiment, extraction is undertaken at a temperature at which the solvent and oil are at least partially miscible, typically between about 100 and about 250° F. and preferably between about 130 and about 190° F. Typically, both the solvent and oil are fed into the extraction column within this temperature range although not necessarily at the same temperature. The solvent dosage (percent of solvent relative to feed fed to the extraction column is typically between 50 and 1000% by volume and preferably between 100 and 500%. Typically, extraction is undertaken in a packed or trayed column whereby the solvent is fed into the top of the column and base oil is fed into the bottom. The packed column can contain either structured or random packing of a conventional type known to those skilled in the art. Water may be injected into the solvent or extraction column as desired to control solvent selectivity. Similarly, temperature gradients or regional heating or cooling can be used at various points along line 50 or across the extraction column to affect performance and selectivity as known to those skilled in the art. Recycles of both raffinate and extract at similar or different temperatures can also be employed. In some instances it may be beneficial to remove a side stream from the extraction column, cool raffinate or extract streams, cool the side stream, separate a portion of the solvent from the oil and return the oil to the column. The solvent may be recovered from the raffinate stream in line 157 and the extract stream in line 155 using distillation. The distillation can be undertaken atmospherically or by using vacuum. One or more flash separators, multi-stage columns and the like, or combinations thereof either operated atmospherically, under pressure or vacuum, can be used in order to separate the solvent from the base oil.

In a preferred embodiment of the present invention as discussed above, hydrofinishing is used to purify and saturate the lower quality base oil stream as a final step. The lower quality base oil stream is mixed with 50 to 2000 scf of hydrogen per barrel of base oil feed, preferable between 70 and 150 scf of hydrogen per barrel of base oil feed, heated to between about 500 and about 1200° F., preferably between about 650 and about 850° F. and pressurized to between about 100 and about 3000 psig and preferably between about 500 and about 800 psig. The mixture is passed through a guard bed consisting of activated clay or spent catalyst and then through a hydrogenation reactor containing one or more hydrogenation catalysts with metal components from Groups V(b), VI(b) and VIII of the Periodic Table, as known to those skilled in the art. Preferably compounds of nickel, molybdenum, vanadium, tungsten or cobalt metal supported on carriers such as activated carbon, kieselguhr, silica, alumina and the like such as a cobalt-molybdenum on alumina, nickel-molybdenum on alumina or nickel-tungsten on silica/alumina. Typically, the hydrogenation is undertaken at a space velocity of about 0.1 to about 10 and preferably between 0.5 and 2 volumes of liquid feed per volume of catalyst per hour. Typically, only one reactor stage is used. However, several stages can be used if desired by using multiple reactors in a series. After the hydrogenation treatment, the base oil fraction is separated from the hydrogen gas and volatile reaction products in a flash vessel, which may be operated at reduced pressure. Typically, the pressure is between a full vacuum and about 100 psig, although wide variations in the suitable pressure are possible.

With both oil streams 156 and 206, if desired, a distillation column can be used to fractionate the base oil into different viscosity cuts. Many variations and schemes are possible to incorporate regenerative or recuperative heat exchangers to recover heat from process streams and optimize the thermal efficiency of the process.

Additional processing may be undertaken on the distillate stream 54 from vessel 52 such as further separating the constituents of this stream such as water, glycols, solvents, light hydrocarbons and the like, thereby creating separate products which may be used or further upgraded to higher quality products. These product streams may also be further treated to improve their quality as known to those skilled in the art.

In the preferred embodiment only one distillate cut is taken from vessel 112 for further processing in stage #2. It is also possible to take a second cut or add another fractionation vessel (not shown) after vessel 112 to further fractionate the base oil distillate to produce different viscosity grades and the like of base oil, which can then be processed separately in stage 2 and stage 3.

The preferred embodiment described above shows continuous flow between the three stages. It may be desirable in certain instances to have intermediate storage vessels between the stages to allow for process surges, contain off specification material, smooth operations, quality control purposes, allow for more than one cut of base oil distillate and the like as known to those skilled in the art.

It may also be preferred in some instance to use a phase transfer catalyst or the like as known to those skilled in the art, to enhance the operation of the second stage of the process whereby the efficiency, selectivity and the like of the process are enhanced thereby providing for better separation of the high quality base oil molecules from the lower quality base oil molecules.

In the third stage of the process presented in the embodiment it may be advantageous to have multiple guard beds, run reactors in parallel or series to utilized phase separators or the like between reactors or between guard beds and reactors. Furthermore, in some instances it may be advantageous to strip the base oil of light contaminants or further fractionate it into different viscosity cuts. Although the system described herein does not utilize a hydrogen recovery system one could be employed to recovery and purify un-reacted hydrogen and reaction products after separation from the product base oil.

In certain instances it may be desirable to upgrade the distillate stream 54 and/or 76 by hydrotreating these in a separate hydrotreating stage as know to those skilled in the art. Alternatively, it is possible to combine these streams with stream 172 and/or stream 96 and hydrotreat the combined streams. If this later approach is employed it may be desirable to include a further fractionation stage to produce a base oil cut and a fuel oil cut.

Figure 3:
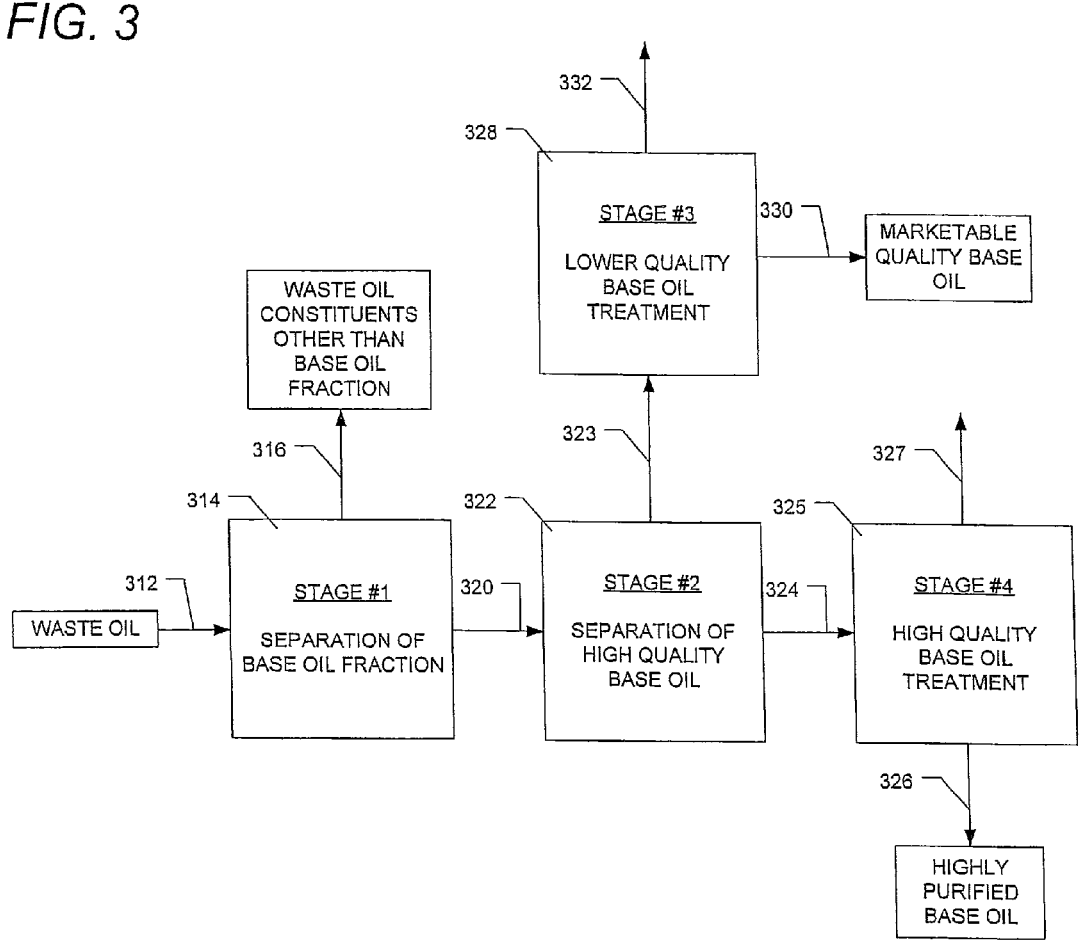
FIG. 3. is a generalized schematic of a second embodiment of the process of the present invention.

In FIG. 3, a generalized embodiment of the present invention is shown. In the embodiment shown, a waste oil stream 312 is charged to a base oil separation zone 314 where a portion of the base oil constituents (base oil fraction), line 320, is separated from the other physical contaminants, line 316, in the waste oil. In actual practice, the various physical contaminants typically may be removed from the base oil fraction in such a way as to produce more than one stream, but for simplicity are shown herein to be separated collectively and recovered through line 316 and may include low molecular weight materials such as light hydrocarbons, water, glycols and the like typically having a boiling range generally below about 500° F., although it may be desirable to include all materials below 650° F., and high molecular weight materials and materials with low volatility including, particulates, polymers salts and the like typically having a boiling point greater than about 1050° F. The base oil fraction recovered through a line 320 typically consist of hydrocarbon molecules suitable for use or manufacture into base oil typically with 18 to 40 carbon atoms and having a boiling range between about 500 to about 1050° F.

In a high quality base oil separation zone 322, a portion of the higher quality base oil molecules (high quality base oil) is separated from the lower quality base oil molecules (lower quality base oil) and recovered through a line 324 and passed to a high quality base oil treatment zone 325 where it is more fully saturated and treated for the removal of various elemental contaminants which are recovered through a line 327, to produce a highly purified base oil which meets the requirements of at least one of API 1509, Group I, II or III which is recovered through a line 326. Various materials, contaminants, derivatives and products thereof and the like are recovered via a line 327.

The lower quality base oil is recovered through a line 323 and passed to a lower quality base oil treatment zone 328 where it is more fully saturated and treated for the removal of various elemental contaminants which are recovered through a line 332, to produce a marketable quality base oil which meets the requirements of at least one of API 1509, Group I, II or III which is recovered through a line 330. Various materials contaminants, derivatives and products thereof and the like are recovered via a line 332. This is a relatively generalized showing of a further process of the present invention. However, it shows an important feature of the present invention.

In the first stage, zone 314, the base oil fraction is separated from physical contaminants in the waste oil. Typically, such contaminants include water, light hydrocarbons, solvents, solids, polymers, high molecular weight hydrocarbons, lubricating oil additives, chemicals, salts and the like. Several processes or combination of processes can be used to effect this separation including various forms of extraction, distillation, filtration, centrifugation, absorption and adsorption and the like as known to those skilled in the art. Typically, the separation will take place based upon differences in the physical or chemical properties of the base oil fraction and the various contaminating materials.

In the second stage, the oil base fraction is then fed to zone 322 of the process where a portion of the lower quality base oil molecules are separated from the high quality base oil. These molecules may comprise polars, aromatics, olefins, unsaturates, heteroatoms and the like, which are separated from the higher quality base oil molecules, which are typically saturated, paraffinic and non-aromatic. The stream in line 323 will typically have a higher concentration of sulfur, oxygen, nitrogen, olefins, aromatics and the like. Various processes or combinations thereof can be used to effect separation of these materials from the high quality base oil. These processes include various forms of extraction, ultrafiltration, absorption, adsorption, molecular sieves and the like, as known to those skilled in the art.

In the third stage, stream 323 is processed in zone 323 by hydrogenating, alkylating, molecular reforming, molecular substituting or the like or a combination thereof, as known to those skilled in the art to remove undesirable elements such as sulfur, nitrogen, oxygen and the like and increase the percent saturation of at least a portion of the hydrocarbon molecules in the lower quality base oil stream. The resulting base oil produced through line 330 is typically of a quality sufficient to meet the requirements for Groups I, II, or III of API 1509.

In the fourth stage, stream 324 is processed in zone 325 by hydrogenating, alkylating, molecular reforming, molecular substituting or the like or a combination thereof, as known to those skilled in the art to remove undesirable elements such as sulfur, nitrogen, oxygen and the like and increase the percent saturation of at least a portion of the hydrocarbon molecules in the lower quality base oil stream. The resulting base oil produced through line 326 is typically of a quality sufficient to meet the requirements for Groups I, II, or III of API 1509.

Figure 4:
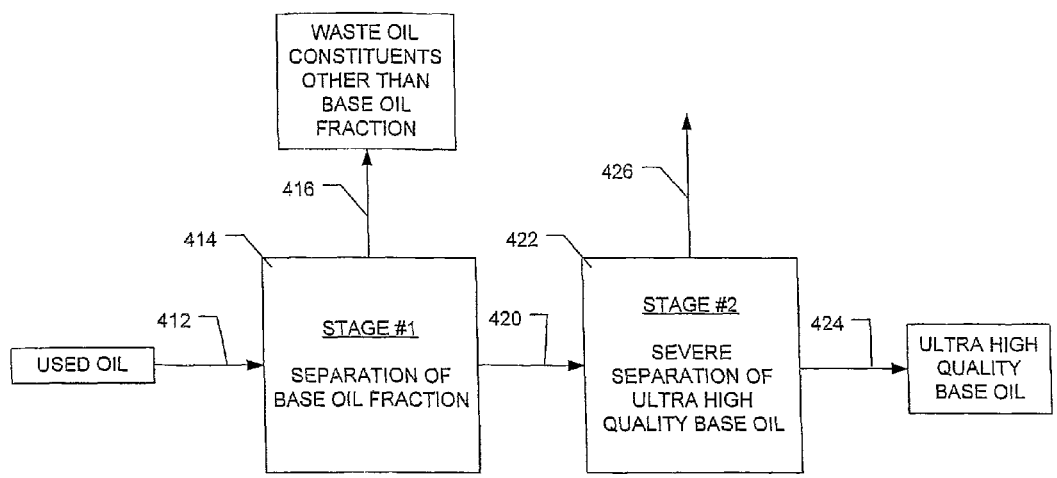
FIG. 4. is a generalized schematic of a third embodiment of the process of the present invention.

In FIG. 4, a generalized embodiment of the present invention is shown. In the embodiment shown, a waste oil stream 412 is charged to a base oil separation zone 414 where a portion of the base oil constituents (base oil fraction), line 420, is separated from the other physical contaminants, line 416, in the waste oil. In actual practice, the various physical contaminants may typically be removed from the base oil fraction in such a way as to produce more than one stream, but for simplicity are shown herein to be separated collectively and recovered through line 416 and may include low molecular weight materials such as light hydrocarbons, water, glycols and the like typically having a boiling range generally below about 500° F., although it may be desirable to include all materials below 650° F., and high molecular weight materials and materials with low volatility including, particulates, polymers, salts and the like typically having a boiling point greater than about 1050° F. The base oil fraction recovered through a line 420 typically consists of hydrocarbon molecules suitable for use or manufacture into base oil typically with 18 to 40 carbon atoms and having a boiling range between about 500 to about 1100° F.

In a severe ultra high quality base oil separation zone 422, a portion of the higher quality base oil molecules (high quality base oil) is separated from the lower quality base oil molecules (lower quality base oil) and recovered through a line 424 for sale as product base oil. This high quality base oil typically meets at least one of Groups I, II or III as set forth by API 1509. The lower quality base oil is recovered through a line 26 and are sold as a fuel oil or further treated to upgrade the oil to a marketable quality base oil.

In the first stage, zone 414, the base oil fraction is separated from physical contaminants in the waste oil. Typically, such contaminants include water, light hydrocarbons, solvents, solids, polymers, high molecular weight hydrocarbons, lubricating oil additives, chemicals, salts and the like. Several processes or combination of processes can be used to effect this separation including various forms of extraction, distillation, filtration, centrifugation, absorption and adsorption and the like as known to those skilled in the art. Typically, the separation will take place based upon differences in the physical or chemical properties of the base oil fraction and the various contaminating materials.

In the second stage, the oil base fraction is then fed to zone 422 of the process where a portion of the lower quality base oil molecules are separated via a line 526. These molecules may comprise polars, aromatics, olefins, unsaturates, heteroatoms and the like, which are separated from the higher quality base oil molecules, which are typically saturated, paraffinic and non-aromatic. The higher quality base oil molecules in line 424 are a high quality base oil stream typically having a percent of saturates greater than 90% and a sulfur content less than about 0.3 weight percent. The stream in line 426 will typically have a higher concentration of sulfur, oxygen, nitrogen, olefins, aromatics and the like. Various processes or combinations thereof can be used to effect separation of these materials from the high quality base oil. These processes include various forms of extraction, ultrafiltration, absorption, adsorption, molecular sieves and the like, as known to those skilled in the art.

Figure 5:
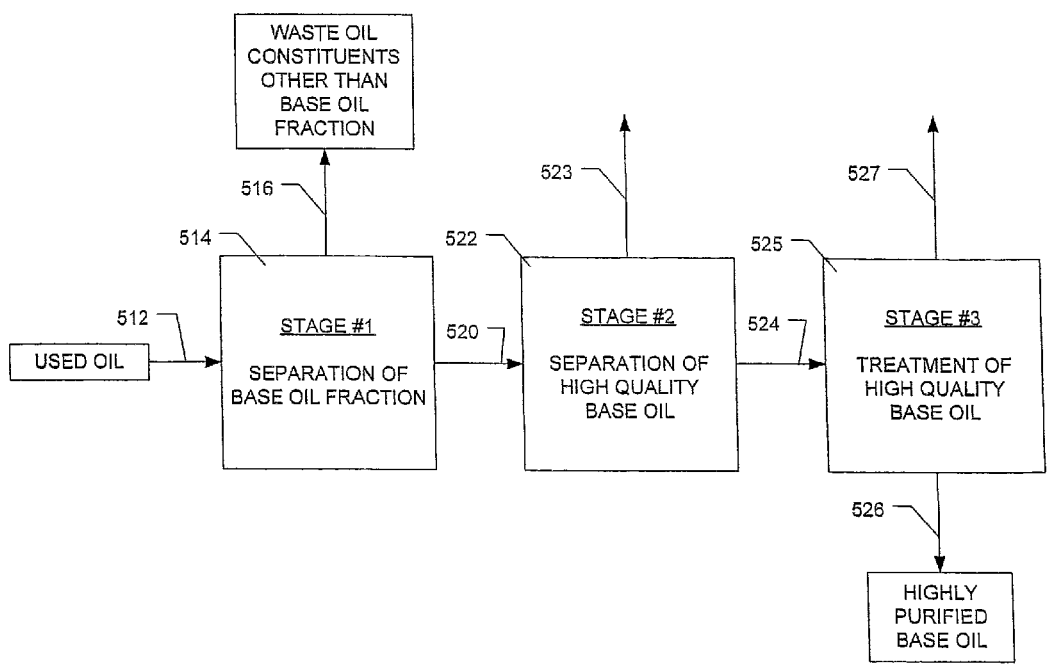
FIG. 5, is a generalized schematic of a fourth embodiment of the process of the present invention.

In FIG. 5, a generalized embodiment 500 of the present invention is shown. In the embodiment shown, a waste oil stream 512 is charged to a base oil separation zone 514 where a portion of the base oil constituents (base oil fraction), line 520, is separated from the other physical contaminants, line 516, in the waste oil. In actual practice, the various physical contaminants may typically be removed from the base oil fraction in such a way as to produce more than one stream, but for simplicity are shown herein to be separated collectively and recovered through line 516 and may include low molecular weight materials such as light hydrocarbons, water, glycols and the like typically having a boiling range generally below about 500° F., although it may be desirable to include all materials below 650° F., and high molecular weight materials and materials with low volatility including, particulates, polymers, salts and the like typically having a boiling point greater than about 1050° F. The base oil fraction recovered through a line 520 typically consist of hydrocarbon molecules suitable for use or manufacture into base oil typically with 18 to 40 carbon atoms and having a boiling range between about 500 to about 1100° F.

In a high quality base oil separation zone 522, a portion of the higher quality base oil molecules (high quality base oil) is separated from the lower quality base oil molecules (lower quality base oil) and recovered through a line 524 and passed to a high quality base oil treatment zone 528 where it is more fully saturated and treated for the removal of various elemental contaminants which are recovered through a line 525, to produce a highly purified base oil which meets the requirements of at least one of API 1509, Group I, II or III which is recovered through a line 526. Various materials contaminants, derivatives and products thereof and the like are recovered via, a line 527. The lower quality base oil is recovered through a line 523 are sold as a fuel oil or further treated to upgrade the oil to a marketable quality base oil.

In the first stage, zone 514, the base oil fraction is separated from physical contaminants in the waste oil. Typically, such contaminants include water, light hydrocarbons, solvents, solids, polymers, high molecular weight hydrocarbons, lubricating oil additives, chemicals, salts and the like. Several processes or combination of processes can be used to effect this separation including various forms of extraction, distillation, filtration, centrifugation, absorption and adsorption and the like as known to those skilled in the art. Typically, the separation will take place based upon differences in the physical or chemical properties of the base oil fraction and the various contaminating materials.

In the second stage, the oil base fraction is then fed to zone 522 of the process where a portion of the lower quality base oil molecules are separated from the higher quality base oil molecules. These lower quality molecules may comprise polars, aromatics, olefins, unsaturates, heteroatoms and the like, which are separated from the higher quality base oil molecules, which are typically saturated, parfinic and non-aromatic. The stream in line 523 will typically have a higher concentration of sulfur, oxygen, nitrogen, olefins, aromatics and the like. Various processes or combinations thereof can be used to effect separation of these materials from the high quality base oil. These processes include various forms of extraction, ultrafiltration, absorption, adsorption, molecular sieves and the like, as known to those skilled in the art.

In the third stage, stream 524 is processed in zone 525 by hydrogenating, alkylating, molecular reforming, molecular substituting or the like or a combination thereof, as known to those skilled in the art to remove undesirable elements such as sulfur, nitrogen, oxygen and the like and increase the percent saturation of at least a portion of the hydrocarbon molecules in the lower quality base oil stream. The resulting base oil produced through line 526 is a highly purified base oil typically of a quality sufficient to meet the requirements for one of Groups I, II, or III of API 1509.

By the process of the present invention, the base oil stream is separated from the waste oil stream and thereafter separated into a high quality base oil stream and a lower quality base oil stream with the lower quality base oil stream then being upgraded to produce a saleable base oil stream. The combination of these steps has produced a surprisingly superior process that yields a surprisingly high quantity of high quality base oil.

The use of this multi-stage process provides several significant advantages over existing process methodologies. The invention of this patent enables both of the objectives of manufacturing products that meet the demands of the market for quality useable products and the desire to maximize the amount of base oil produced from the waste oil. Exiting processes can only produce high quality base oil at the expense of the process efficiency or yield loss.

The total base oil produced through lines 156 and 206 in FIG. 2 is more than has been produced by (previous processes and is of higher overall quality. When previous extraction processes are used to separate the base oil from other undesirable components, the extraction treatment is required to be relatively intense in order to produce high quality base oil and consequently results in a base oil yield loss due to over extraction. Similarly, when previous hydrotreating processes are used relatively intense treatment is again required in order to produce high quality base oil. This severe treatment results in cracking of some of the base oil molecules into smaller non-base oil molecules resulting in yield loss. Thus neither of these processes alone are capable of producing a high yield and high quality base oil.

According to the present invention, a base oil material is charged to extraction and intense extraction can be used to separate the lower quality base oil, containing contaminants, from the high quality base oil since the extracted oil is recovered and upgraded in the next stage without concern for yield loss. Through the use of the multi-stage process described herein, it is possible to produce a high yield and high quality base oil due to the removal of the threat of yield loss. This surprising result has not heretofore been achieved using known processing methods.

A further advantage of the present invention is its ability to produce a high yield of base oil with an overall high quality. Typically from about 45 to about 65 percent of the oil content of the waste oil stream, depending on the desired base quality of base oil is recovered in stage 2 through stream 156 and an addition 10 to 30 percent of base oil is produced in stage 3 through stream 206. Typically, over 90 percent of the base oil contained in the waste oil stream 42 is recovered and/or upgraded through the process described herein resulting in an overall base oil yield of between 75 and 85%. Typically known process only yield between 60 and 65 percent base oil.

Another unexpected advantage of the current invention over existing technologies is its ability to process waste oils of varying specification and quality and still produce a high yield of high quality base oil. Existing processes are highly influence by feedstock quality and their product quality and/or yield are highly influenced by feedstock quality. The invention outlined herein is capable of processing a wide variety of waste oils and still manufacturing a high quality base oil and maintain a high yield of total base oil product.

The present invention also has the unexpected benefit of reducing capital expenditures. In known processes the good base oil molecules are typically treated with the contaminated base oil molecules, even though upgrading of the good base oil molecules may not be necessary. Because of this the upgrading process must be sized larger to process all of the base oil molecules together. Typically upgrading equipment is very expensive to build and operate. In the current invention the good base oil molecules are separated from the contaminated base oil molecules prior to upgrading the contaminated molecules. By doing so the upgrading processing equipment can be sized smaller thereby saving capital and operating costs.

The use of the type of distillation system disclosed herein is considered to provide substantial advantages over previous systems. The process provides additional efficiency and economic benefits since it uses simple flash vessels enabling more effective separation with less complicated equipment at each stage. Similarly, it enables excellent separation of the contaminants typically found in waste oil yielding a base oil distillate suitable for further processing and upgrading. The sequential removal of physical contaminants also enables good control over the separation of contaminants yielding valuable products in addition to the base oil distillate such as fuel oil, asphalt and the like. The in-situ distillation system described herein does not have mechanical means such as those found in film evaporators and the like resulting in lower capital maintenance and operating costs. A further advantage of the in situ distillation system is that it avoids the typical problems of packing fouling, which can be experienced when processing used oil through packed columns. Flash vessels do not have any packing and thus have minimal surfaces and contact points for fouling deposits to occur. When packed column are used to effect distillation the packing can become fouled with tarry deposits reducing packing efficiency and eventually restricting the flow and material in the column again resulting in increased operational and maintenance costs.

A surprising benefit of the process is its ability to avoid the problem of heat exchanger fouling typically experienced in waste oil processing facilities utilizing hot surfaces to affect heat exchange. The return streams for vessels 70 and 90 are used to maintain the temperature in the liquid layer in the bottom of the vessels. The oil fed into vessels 70 and 90 is heated to the temperature necessary to effect the desired separation by direct contact with the liquid layer in the bottom of the vessels. The benefit is achieved by heating and vaporizing the oil through direct contact with the hotter fluid residing in the bottom layer of the vessel. Fouling reactions and the like which typically occur when evaporation occurs at the boundary layer of the hot surfaces of heat exchangers and result in deposits, reduced efficiency and maintenance are reduced due to the absence of a hot metal surfaces in which to deposit fouling products. Thus the current invention increases the efficiency of heat exchange, reduces maintenance and ultimately increases equipment availability.

The solvent extraction system employed herein has produced surprising results by producing API Group III Base oil. No other re-refining technology heretofore has been able to produce base oil of this high quality.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for processing a waste oil stream comprising:
    a) passing the waste oil stream into a first flash distillation vessel and producing a first overhead stream and a first bottom stream;
    b) passing at least a portion of the first overhead stream directly out of the first flash distillation vessel via a sealed distillate outlet and passing substantially all of the first bottom stream to a heated liquid layer contained in a second flash distillation vessel and producing a second overhead stream and a second bottom stream by direct contact with the heated liquid layer; and
    c) passing a portion of the second bottom stream out of the second flash distillation vessel and heating and returning another portion of the second bottom stream to the second flash distillation vessel to maintain the heated liquid layer in the second distillation vessel at a selected temperature and at a selected level, the selected temperature and selected level being sufficient to flash a portion of the heated first bottom stream to the second flash distillation vessel thereby producing the second bottom stream and the second overhead stream.

2. The method of claim 1 wherein at least one of the first and second flash distillation vessels is operated under vacuum.

3. The method of claim 1 wherein the first overhead stream comprises water, light hydrocarbons and low boiling, point materials having a boiling point below 350 degrees Fahrenheit.

4. The method according to claim 3 wherein the waste oil stream is heated prior to distillation to remove the water, light hydrocarbons and low boiling point materials.

5. The method of claim 1 wherein the second overhead stream comprises fuel compounds having a boiling point between 350 degrees and 500 degrees Fahrenheit.

6. The method of claim 5 wherein a third overhead stream having a base oil compounds with a boiling range from about 500 to about 650° F. and a fourth overhead stream having base oil compounds with a boiling point from about 650 to about 1050° F.

7. The method according to claim 6 wherein the fourth overhead stream is treated with solvent extraction to remove high quality oil, and the treated fourth overhead stream is then combined with the third overhead stream and the combined treated fourth overhead stream and third overhead stream are hydrogenated.

8. The method of claim 1 further comprising extracting a third overhead stream from a third flash distillation vessel that comprises base oil compounds having a boiling point between 500 and 650 degrees Fahrenheit.

9. The method of claim 1 further comprising extracting a third overhead stream from a third flash distillation vessel that comprises base oil compounds having a boiling point between 650 and 1050 degrees Fahrenheit.

10. The method of claim 9 further comprising:
contacting the third overhead stream with a solvent effective to separate high quality base oil from lower quality base oil in a solvent extraction zone and recovering a stream of high quality base oil and solvent and a stream of lower quality base oil and solvent;
separating the high quality base oil and the solvent to produce a stream of product high quality base oil;
separating the lower quality base oil and the solvent to produce a lower quality base oil stream; and
combining the second overhead stream with the lower quality base oil stream to produce a combined stream and passing the combined stream to hydrogenation to produce a high quality base oil stream.

11. The method of claim 1 wherein the waste oil stream is a waste oil prone to coking. are produced.

12. The method according to claim 1 wherein the waste oil stream is treated with an alkali or base to condition the liquid stream prior to distillation in the first flash distillation vessel.

13. The method according to claim 12 wherein the alkali or base is one of sodium carbonate, sodium hydroxide and potassium hydroxide.

14. The method of claim 1 wherein the first flash distillation vessel and the second flash distillation vessel are operated at or near atmospheric pressure.

15. A method for separating a waste oil stream comprising:
a) treating the waste oil stream with one of an alkali or base in a heater;
b) charging the treated waste oil stream into a flash distillation vessel having a liquid stream inlet, a sealed distillate outlet near the top of the vessel, a lower portion and a bottom stream outlet near the bottom of the vessel and a single stage of separation to produce an overhead stream through the overhead outlet and a bottom stream from the bottom stream outlet; and
c) passing substantially all of the heated bottom stream to a liquid layer in a second flash distillation zone, the liquid layer being at a temperature sufficient to flash a portion of the bottom stream.

16. The method of claim 15 wherein a plurality of flash distillation vessels are used to produce a plurality of distillate streams and a plurality of product bottom streams.

17. The method of claim 16 wherein three flash distillation vessels are used.

18. The method of claim 16 wherein four ash distillation vessels are used.

19. The method of claim 16 wherein five or more distillation vessels are used.

20. The method of claim 16 wherein a distillate stream having a boiling range from about 500 to about 650° F. and a distillate stream having a boiling point from about 650 to about 1100° F. are produced.

21. The method of claim 15 wherein at least one of the flash distillation vessels is operated under vacuum.

22. The method according to claim 15 wherein the overhead stream comprises water, light hydrocarbons and low boiling point materials having a boiling point below 350 degrees Fahrenheit.

23. The method according to claim 15 wherein the alkali or base is one of sodium carbonate, sodium hydroxide, and potassium hydroxide.

24. The method of claim 15 wherein the flash distillation vessel is operated at or near atmospheric pressure.

25. A method for separating a waste oil stream by flash distillation, comprising:
treating the waste oil stream with one of sodium carbonate, sodium hydroxide and potassium hydroxide in a heater to condition the waste oil stream prior to flash distillation;
treating the conditioned waste oil stream to remove water, light hydrocarbons and low boiling point materials having a boiling point below 350 degrees Fahrenheit in a first flash distillation vessel to generate a conditioned and treated waste oil stream, and removing the water, light hydrocarbons and low boiling point materials having a boiling point below 350 degrees Fahrenheit using a first outlet line that is sealed from an external environment;
passing substantially all of the conditioned and treated waste oil stream directly into a heated liquid layer contained in a second flash distillation vessel and producing an overhead stream of fuel components having a boiling point between 350 degrees and 500 degrees Fahrenheit and a bottom stream by direct contact with the heated liquid layer;
heating a portion of the bottom stream to a selected temperature and returning the portion of the heated bottom stream to the second flash distillation vessel to maintain the heated liquid layer in the selected distillation vessel at a selected temperature and at a selected level in the second flash distillation vessel in a lower portion of the vessel, the selected temperature and selected level being sufficient to flash a portion of the conditioned and treated waste oil stream to produce the bottom stream and the overhead stream;
passing at least a portion of the overhead stream and the bottom stream out of the second flash distillation vessel; and
wherein at least one of the flash distillation zones is operated under vacuum.

26. The method of claim 25 wherein the first flash distillation vessel is operated at or near atmospheric pressure.

* * * * *